United States Patent [19]

Kadija et al.

[11] 4,217,198
[45] Aug. 12, 1980

[54] COATED PERFLUOROSULFONIC ACID RESIN MEMBRANES AND A METHOD FOR THEIR PREPARATION

[75] Inventors: Igor V. Kadija; Kenneth E. Woodard, Jr., both of Cleveland, Tenn.

[73] Assignee: Olin Corporation, New Haven, Conn.

[21] Appl. No.: 23,065

[22] Filed: Mar. 23, 1979

[51] Int. Cl.$^2$ ............... C25C 7/04; C25B 13/08; B05D 1/02
[52] U.S. Cl. .................... 204/252; 204/296; 427/385.5
[58] Field of Search ............ 204/295, 296, 252, 180 P; 427/385 B; 428/421

[56] References Cited

U.S. PATENT DOCUMENTS

| | | | |
|---|---|---|---|
| 3,838,104 | 9/1974 | Hayashi et al. | 526/243 |
| 3,849,521 | 11/1974 | Kirimoto et al. | 525/200 |
| 3,909,378 | 9/1975 | Walmsley | 204/296 |
| 3,997,507 | 12/1976 | Kirimoto et al. | 526/287 |
| 4,100,340 | 7/1978 | Waldmann et al. | 428/421 |

FOREIGN PATENT DOCUMENTS 2300144  9/1976  France .

Primary Examiner—F. C. Edmundson
Attorney, Agent, or Firm—James B. Haglind; Donald F. Clements

[57] ABSTRACT

An improved cation-exchange membrane for use in electrolytic processes which is comprised of a film of a perfluorosulfonic acid resin having a fluoroalkyl resin coating. The improved membrane is produced by applying an uncured fluoroalkyl resin in liquid form to a surface of the film and curing the fluoroalkyl resin to provide a solid coating on the surface of the film. The improved membrane provides efficient ion separation properties at reduced costs for energy.

10 Claims, No Drawings

COATED PERFLUOROSULFONIC ACID RESIN MEMBRANES AND A METHOD FOR THEIR PREPARATION

This invention relates to electrolytic cells employing ion exchange membranes for the electrolysis of aqueous solutions of ionizable compounds. More particularly, this invention relates to improved cation exchange membranes for electrolytic cells, and a method for preparing them.

The electrolysis of aqueous solutions of ionizable chemical compounds, for example, alkali metal chloride brine solutions to produce chlorine and alkali metal hydroxide solutions in a cell equipped with an anode and a cathode separated by a porous diaphragm is well known in this art. In most instances, such cells are operated under conditions which permit ionic migration and molecular migration through the porous diaphragm to a substantial degree. As a result, the catholyte is contaminated with undecomposed electrolyte and the anolyte is contaminated with products of reactions between the catholyte and the anolyte.

In recent years, membrane cells have been developed, in which the porous diaphragm has been replaced with a membrane material. This permits the transport of alkali metal ions from the anode compartment to the cathode compartment, but prevents transfer of the brine solution. This development has provided a means for production of solutions of a highly concentrated salt-free alkali metal hydroxide.

The use of membrane-equipped electrolytic cells has not become widespread because of problems encountered with the relatively low current and power efficiencies in comparison to the conventional diaphragm cell.

When electrolyzing aqueous solutions of alkali metal chlorides in the production of chlorine and alkali metal hydroxides in a typical membrane cell installation, it is estimated that energy requirements account for 50 percent of the total manufacturing costs. Accordingly, it is important to obtain the maximum current efficiency while maintaining a low voltage during the operation of membrane cells to minimize energy costs.

It is an object of the present invention to provide a membrane having efficient separation properties at reduced costs for energy.

Another object of the present invention is to provide a process for the preparation of this membrane.

These and other objects of the invention are accomplished in a membrane for use in electrolytic processes comprised of a film of a perfluorosulfonic acid resin having a fluoroalkyl resin coating and a process for preparing these membranes which comprises applying an uncured fluoroalkyl resin to the surface of a film of the perfluorosulfonic acid resin and curing the fluoroalkyl resin to provide a solid coating on the surface.

Membranes suitable for coating by the process of the present invention are comprised of solid perfluorosulfonic acid resins. The perfluorosulfonic acid resins are preferably hydrolyzed copolymers of a fluorinated vinyl compound and fluorosulfonated perfluorovinyl ether. Suitable fluorinated vinyl compounds include vinyl fluoride, hexafluoropropylene, vinylidene fluoride, trifluoroethylene, chlorotrifluoroethylene, perfluoro(alkylvinyl ether), tetrafluoroethylene and mixtures thereof. Preferred fluorinated vinyl compounds are tetrafluoroethylene and hexafluoropropylene, with tetrafluoroethylene being particularly preferred.

The fluorosulfonated perfluorovinyl ethers are compounds of the formula $CF_2=CFOR_fSO_2F$ wherein $R_f$ is a bifunctional perfluorinated radical comprising one to eight carbon atoms. The $R_f$ radical of the formula above can be either branched or unbranched, i.e., straight chain and can have one or more ether linkages.

Illustrative of such fluorosulfonated perfluorovinyl ethers are:

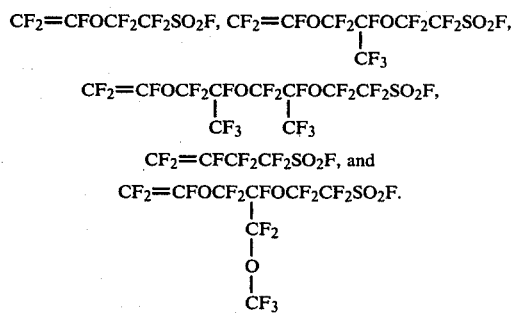

The most preferred fluorosulfonated perfluorovinyl ether is perfluoro(3,6-dioxa-4-methyl-7-octenesulfonyl fluoride),

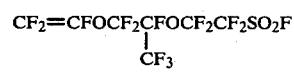

The fluorosulfonated perfluorovinyl ethers are disclosed in such references as U.S. Pat. No. 3,282,875, to Connolly et al; U.S. Pat. No. 3,041,317, to Gibbs et al; U.S. Pat. No. 3,560,568, to Resnick; and U.S. Pat. No. 3,718,627, to Grot.

The hydrolyzed copolymers are prepared by general polymerization techniques developed for homo- and copolymerizations of fluorinated ethylenes, particularly those employed for tetrafluoroethylene which are described in the literature.

The $FSO_2$ group of the solid persulfonic acid resin is converted to an $SO_3H$ group or a sulfonate group (such as an alkali metal sulfonate) or a mixture thereof. The equivalent weight of the perfluorocarbon copolymer ranges from about 900 to about 1,600 and preferably from about 1,100 to about 1,500. The equivalent weight is defined as the average molecular weight per sulfonyl group.

Perfluorosulfonic acid resins used in membranes coated by the process of the present invention may also contain substituents such as primary amines described, for example, in U.S. Pat. No. 4,085,071, issued on Apr. 18, 1978, to P. R. Resnick or polyamines as described, for example, in U.S. Pat. No. 4,030,988 issued June 21, 1977, to W. G. Grot.

Typically, perfluorosulfonic acid resin membranes suitable for electrolytic processes are homogeneous films having a thickness in the range of from about 1 to about 10 mils. For increased mechanical strength, the films are often combined, for example, by lamination with a support material. Fabrics of perfluoroolefins such as polytetrafluoroethylene material are commonly used as support materials.

Preferred perfluorosulfonic acid resin membranes are those produced by E. I. duPont de Nemours and Company and sold commercially under the trademark "Nafion".

Improved membranes for use in electrolytic processes are obtained by coating these perfluorosulfonic acid resins with a fluoroalkyl resin. The fluoroalkyl resins used include polymeric materials which are commercially available as water repellents. Examples of these commercial water repellents include fluoroalkyl resins sold under the tradename "Asahi Guard" ® by the Asahi Glass Company and "Scotchguard" ® by the 3M Company. The resins are polymers or copolymers derived from a fluoroalkyl monomer where the alkyl group has from about 3 to about 15 carbon atoms. Preferred fluoroalkyl monomers are those which are esters of unsaturated acids such as acrylic acid or methacrylic acid. Suitable examples include:

$CF_3(CF_2)_7(CH_2)_{11}OCOCH=CH_2$,
$CF_3(CF_2)_4CH_2OCOC(CH_3)=CH_2$,
$(CF_3)_2CF(CF_2)_6(CH_2)_3OCOCH=CH_2$,
$(CF_3)_2CF(CF_2)_{10}(CH_2)_3OCOCH=CH_2$,
$CF_3(CF_2)_6(CH_2)_2OCOC(CH_3)=CH_2$,
$(CF_3)_2CF(CF_2)_6(CH_2)_2OCOCH=CH_2$,
$CF_3(CF_2)_7SO_2N(C_3H_7)(CH_2)_2OCOCH=CH_2$
$CF_3(CF_2)_7(CH_2)_4OCOCH=CH_2$,
$CF_3(CF_2)_7SO_2N(CH_3)(CH_2)_2OCOC(CH_3)=CH_2$,
$CF_3(CF_2)_7(CH_2)_3COOCH=CH_2$,
$(CF_3)_2CF(CF_2)_6CH_2CH(OH)CH_2OCOCH=CH_2$,
$(CF_3)_2CF(CF_2)_6CH_2CH(OCOCH_3)OCOC(CH_3)=CH_2$,
$CF_2ClCF_3CF(CF_2)_7CONHCOOCH=CH_2$,
$H(CF_2)_{10}CH_2OCOCH=CH_2$, and
$CF_2Cl(CF_2)_{10}CH_2OCOC(CH_3)=CH_2$. These fluoroalkyl monomers are preferably copolymerized with unsaturated compounds such as vinyl ethers; esters including acrylates, methacrylates and crotonates; amides such as methylolacryamide, methylolmethacrylate, diacetoneacrylamide or diacetonemethaacrylamide; or halides such as vinyl chloride, chloroprene or 2-chloro-1,3-butadiene.

The copolymers are prepared by known polymerization reactions such as bulk polymerization, solution polymerization, suspension polymerization, emulsion polymerization, radiation polymerization, and photopolymerization. Suitable water repellent fluorochemical resins may be produced, for example, by the processes described in U.S. Pat. No. 3,838,104, issued Sept. 24, 1974, to T. Hayashi et al; U.S. Pat. No. 3,849,521, issued Nov. 19, 1974, to K. Kirimoto et al; or U.S. Pat. No. 3,997,507, issued Dec. 14, 1976, to K. Kirimoto et al.

The perfluorosulfonic acid resin membranes may be coated with the fluoroalkyl resin in any suitable manner. For example, liquids containing the fluoroalkyl resins are available as solutions, emulsions, or aerosols in solvents such as acetone, trichloroethane, tri- and perchloroethylene, ethylene, isopropyl alcohol, ethylene glycol, water and mixtures thereof. These liquids may be applied to the membrane material by methods such as painting, rolling, dipping, or spraying.

A sufficient amount of fluoroalkyl resin is applied which will impart to the membranes the improved properties desired. Generally, this amount is present when the appearance of the membranes tend to become opalescent. Suitable amounts include from about 0.5 to about 15, and preferably from about 2 to about 10 grams of fluoroalkyl resin per square meter of diaphragm material. The fluoroalkyl resin may be applied as one or several coats to achieve the desired results.

The fluoroalkyl resin is applied to the area of the perfluorosulfonic acid resin membranes having the active sites or functional groups for ion exchange and which will, for example, in a chlor-alkali cell, contact the anolyte and permit the transfer of cations.

Following application of the fluoroalkyl resins, the membrane is maintained at a temperature in the range from about ambient to about 200° C., and preferably from about 100° to about 150° C. for a sufficient time to evaporate any solvent present and to cure the coating. Generally the time required for curing at the preferred temperature range is from about 2 to about 10, and preferably from about 3 to about 5 minutes. However, shorter or longer periods may be employed, if desired. After curing, the membrane has a solid coating of fluoroalkyl resin.

Before installing the coated membranes in an electrolytic cell, they are preconditioned in the same manner as membranes which are not coated by the method of the present invention. For example, where the membranes will be used in a cell for the electrolysis of an alkali metal chloride to produce chlorine and an alkali metal hydroxide, the membranes are immersed in a solution of the alkali metal hydroxide. This solution is maintained initially at a temperature in the range of, for example, from about 70° to about 95° C., and allowed to cool to room temperature over a period of from about 1 to about 30 hours.

After treating the coated membranes in the above manner, the coated membranes are ready for installation in an electrolytic cell.

Electrolytic cells in which the coated membranes of the present invention may be used include those which are employed commercially in the production of chlorine and alkali metal hydroxides by the electrolysis of alkali metal chloride brines. Alkali metal chloride brines electrolyzed are aqueous solutions having high concentrations of the alkali metal chlorides. For example, where sodium chloride is the alkali metal chloride, suitable concentrations include brines having from about 200 to about 350, and preferably from about 250 to about 320 grams per liter of NaCl. The cells have an anode assembly containing a plurality of foraminous metal or graphite anodes, a cathode assembly having a plurality of foraminous metal cathodes with the novel membrane separating the anodes from the cathodes. Suitable electrolytic cells which utilize the novel diaphragms of the present invention include, for example, those types illustrated by U.S. Pat. Nos. 1,862,244; 2,370,087; 2,987,463; 3,247,090; 3,477,938; 3,493,487; 3,617,461; and 3,642,604.

Membranes of the present invention may also be suitably used, for example, in cells which electrolyze alkali metal hydroxides to produce hydrogen and oxygen.

The coated membranes and process for their preparation of the present invention are illustrated by the following examples without any intention of being limited thereby. All parts and percentages are by weight unless otherwise specified.

EXAMPLE 1

A section of a cation exchange membrane was sprayed with a liquid containing a fluoroalkyl resin water repellent. The membrane was 7 mils thick and was composed of a perfluorosulfonic acid resin (1150 equivalent weight) which had been modified by treatment with ethylene diamine (E. I. duPont de Nemours NAFION membrane). The fluoroalkyl resin was sprayed from an aerosol container onto the side of the membrane which would be in contact with the anolyte. Spraying was discontinued when the membrane appeared to be opalescent. The coating was cured at a temperature of 100° C. for a period of 4 minutes. A second coat of water repellent was applied and the coated membrane cured at 100° C. for about 3 minutes. Prior to installation as a membrane, the section was immersed in a 15 percent NaOH solution at 80° C. and kept for about 2 hours. The coated membrane was installed in an electrolytic cell employing a ruthenium oxide coated titanium mesh anode and a steel mesh cathode. The membrane was placed with the uncoated side against the surface of the cathode. The coated side of the membrane contacted a sodium chloride brine having a concentration of about 300 grams of NaCl which was fed to the anode compartment. Current was passed through the brine at a density of 2.0 kiloamps per square meter of anode surface. The cell operated for a period of 21 days at a voltage in the range of 3.4–3.8 volts to produce a cathode liquor containing 230–400 grams of NaOH and 4–6 grams of NaCl. During the period of cell operation, current efficiencies were in the range of 88–95 percent. The power consumption was calculated to be in the range of 2600–2800 kilowatt hours per ton of chlorine produced.

COMPARATIVE EXAMPLE A

A section of the same perfluorosulfonic acid resin membrane used in Example 1 was installed in a cell of the type employed in Example 1. The membrane section was identical to that used in Example 1 with the exception that it was not coated with the fluoroalkyl resin. The cell was operated to electrolyze sodium chloride brine having a concentration of 300 grams of NaCl per liter at a current density of 2.0 kiloamps per square meter of anode surface. During a 21 day period the cell voltage was in the range of 3.5–3.7 to produce a cathode liquor containing 350–380 grams of NaOH and 0.5 gm. of NaCl. However, current efficiencies were in the range of 79 to 85 percent with the power consumption determined to be 2900–3100 KWH per ton of chlorine produced.

Example 1 shows the effectiveness of the coated membrane of the present invention in reducing the power consumption of the cell operation in the production of chlorine and sodium hydroxide.

EXAMPLE 2

A section of the same perfluorosulfonic acid membrane used in Example 1 was sprayed with the fluoroalkyl resin water repellent in aerosol form (Asahi Guard AG-630). The coated polytetrafluoroethylene was cured at 100° C. for 3–4 minutes. Four additional coats of water repellent were sprayed onto the perfluorosulfonic acid resin and the membrane dried at 100° C. for about 3 minutes between each successive coat. After the final coat of water repellent was applied, the membrane was dried at 150° C., for a period of 3 minutes. The coated perfluorosulfonic acid resin membrane was soaked for two hours in a 15 percent NaOH solution whose temperature was maintained at 80° C. The coated perfluorosulfonic acid resin membrane was then employed in the electrolytic cell of Example 1. Sodium hydroxide at a concentration in the range of 230–330 grams per liter was produced during a 17 day period at cell voltages in the range of 3.2–3.4 volts and current efficiencies in the range of 81–96 percent. Power consumption was determined to be in the range of 2360–2800 KWH per ton of chlorine produced.

EXAMPLE 3

Two coats of a fluoroalkyl resin water repellent (3M Co. Scotchguard FC-4101-16) were applied to a section of the perfluorosulfonic acid membrane employed in Example 1. The sheet was dried between each coat at 100° C. for about 3 minutes. After the final drying at 150° C. for 3 minutes, the coated membrane was soaked for 2 hours in a 20 percent solution of sodium hydroxide at 85° C. The coated membrane was installed in the cell of Example 1 in which electrolysis was conducted by the procedure of Example 1. Over a period of 10 days, a caustic liquor containing an average concentration of 350–370 grams per liter of NaOH and 5–7 grams per liter of NaCl was produced at current efficiencies in the range of 83–89 percent at a cell voltage of 3.5–3.7 volts and a power consumption range of 2770–2980 KWH per ton of chlorine produced.

EXAMPLE 4

A section of the perfluorosulfonic acid resin membrane was sprayed with a single coat of the fluoroalkyl resin water repellent (Asahi Guard 630). The cooling was cured at 100° C. for 4 minutes. Using the identical cell and procedure of Example 1, the coated membrane was preconditioned, installed in the cell, and the cell operated for a period of 13 days to produce sodium hydroxide solutions having a concentration of NaOH of from 285 to 440 grams per liter. Current efficiencies of 85–90 percent were obtained at cell voltages in the range of 3.4–4.0. A power consumption range of 2850–3000 KWH per ton of chlorine produced was determined.

What is claimed is:

1. A membrane for use in electrolytic processes comprised of a film of a perfluorosulfonic acid resin having a fluoroalkyl resin coating.

2. The membrane of claim 1 in which said perfluorosulfonic acid resin has an equivalent weight of from about 900 to about 1600.

3. The membrane of claim 2 in which said perfluorosulfonic acid resin is coated with said fluoroalkyl resin in an amount of from about 0.5 to about 15 grams per square meter of said membrane.

4. The membrane of claim 3 in which said fluoroalkyl resin includes a fluoroalkyl group having from about 3 to about 15 carbon atoms in said alkyl group.

5. The membrane of claim 4 in which said perfluorosulfonic acid resin has an equivalent weight of from about 1100 to about 1500.

6. The membrane of claim 5 in which said perfluorosulfonic acid resin is coated with said fluoroalkyl resin in an amount of from about 2 to about 10 grams per square meter of membrane.

7. A process for producing membranes for use in electrolysis processes which comprises applying an uncured fluoroalkyl resin to the surface of a film of a perfluorosulfonic acid resin to provide a coating of said fluoroalkyl resin and curing said fluoroalkyl resin to provide a solid coating on said surface.

8. The process of claim 7 in which said surface of said film of perfluorosulfonic acid resin is maintained at a temperature in the range from ambient to about 200° C. for a sufficient time to cure said fluoroalkyl resin.

9. The process of claim 7 in which said fluoroalkyl resin is applied to said surface of said film of perfluorosulfonic acid resin in aerosol form.

10. An electrolytic cell for the electrolysis of aqueous solutions of alkali metal chlorides employing the coated membrane of claims 1, 3, or 6.

* * * * *